United States Patent
Campana (10) Patent No.: US 10,924,437 B2
(45) Date of Patent: Feb. 16, 2021

(54) INTELLIGENT NETWORK SWITCH

(71) Applicant: Videotec S.p.A., Schio (IT)

(72) Inventor: Ottavio Campana, Schio (IT)

(73) Assignee: VIDEOTEC S.P.A., Schio (IT)

( * ) Notice: Subject to any disclaimer, the term of this patent is extended or adjusted under 35 U.S.C. 154(b) by 27 days.

(21) Appl. No.: 16/078,171

(22) PCT Filed: Feb. 22, 2017

(86) PCT No.: PCT/IB2017/051012
§ 371 (c)(1),
(2) Date: Aug. 21, 2018

(87) PCT Pub. No.: WO2017/145071
PCT Pub. Date: Aug. 31, 2017

(65) Prior Publication Data
US 2019/0058676 A1 Feb. 21, 2019

(30) Foreign Application Priority Data

Feb. 23, 2016 (IT) .............................. UB2016A0964

(51) Int. Cl.
| | |
|---|---|
| H04L 12/931 | (2013.01) |
| H04L 12/729 | (2013.01) |
| H04N 5/232 | (2006.01) |
| H04L 29/12 | (2006.01) |
| H04N 5/247 | (2006.01) |

(52) U.S. Cl.
CPC .......... H04L 49/602 (2013.01); H04L 45/125 (2013.01); H04L 61/2015 (2013.01); H04N 5/23206 (2013.01); H04N 5/247 (2013.01); H04L 61/6022 (2013.01)

(58) Field of Classification Search
CPC . H04L 49/602; H04L 61/2015; H04L 45/125; H04L 61/6022; H04N 5/247; H04N 5/23206
See application file for complete search history.

(56) References Cited

U.S. PATENT DOCUMENTS

| | | |
|---|---|---|
| 2008/0247457 A1 | 10/2008 | Cromwell et al. |
| 2010/0198989 A1 | 8/2010 | Jia et al. |
| 2013/0343731 A1 | 12/2013 | Pashkevish et al. |

OTHER PUBLICATIONS

Goel et al., An Adaptive Routing Scheme for Heterogeneous Data-flows using Openflow, 2015 IEEE International Conference on Cloud Computing in Emerging Markets (Year: 2015).*

(Continued)

*Primary Examiner* — Justin T Van Roie
(74) *Attorney, Agent, or Firm* — Florek & Endres PLLC (57) ABSTRACT

The present invention relates to a method for controlling the transfer of data packets in an IP network. A device transmits a plurality of data packets in the IP network that are received by a switch on an input port. The switch analyses the data packets received by the device and extracts information identifying the type of device connected, and on the basis of this information, identifies in an internal memory area the criteria for setting the operating parameters of an application software executed by the device. The switch provides the device with operating parameters that are calculated on the basis of the criteria contained in the memory area such that the device subsequently executes the application software using the values provided by the switch.

8 Claims, 5 Drawing Sheets

(56) References Cited

OTHER PUBLICATIONS

Boureanu, Vlad, International Search Report and Written Opinion dated Jun. 26, 2017, European Patent Office, P.B. 5818 Patentlaan 2 NL—2280 HV Rijswijk.

Boureanu, Vlad, International Preliminary Report on Patentability dated May 25, 2018, European Patent Office, P.B. 5818 Patentlaan 2 NL—2280 HV Rijswijk.

* cited by examiner

INTELLIGENT NETWORK SWITCH

TECHNICAL FIELD

The present invention relates to IP networks, in particular for video surveillance applications, and switches used in such networks.

In particular, the invention relates to a network switch according to the preamble of claim 1.

STATE OF THE ART

Nowadays, in video surveillance systems, video cameras, sensors, and other active devices of the system are connected to switches that are capable of transferring data packets from these devices to Video Management Software (VMS) and vice versa.

In general, video surveillance systems based on IP networks are implemented using general purpose switches, which makes it possible to meet system connectivity requirements, but do not fully meet the security requirements expected for this type of system.

In general, a general purpose switch is an embedded system with a small processor and a small amount of RAM memory which is used to export a configuration interface through which the installer can simply define certain parameters relating to packet switching.

To improve the security and robustness of the network, switches with advanced features have been designed and manufactured.

In detail, in order to improve the security of networks, switches designed specifically to protect the network from outside attacks are known. For example, the Tungsten® switch by Senstar® internally comprises a DHCP (Dynamic Host Configuration Protocol, defined in RFC 1531, RFC 1541 and RFC 2131) server to assign IP addresses to network devices, and implements advanced multi-layer security features that allow it to detect and identify each element and endpoint in the network, and analyse incoming data traffic to allow access only to data traffic from authorised entities.

To improve the robustness of a surveillance system, it is however known to provide redundant links and use a layer 2 network switch with tree spanning protocols, such as for example STP (Spanning Tree Protocol, defined by the IEEE standard 802.1D) or RSTP (Rapid Spanning Tree, defined by the standard IEEE 802.1w). These switches are able to divert data packets from one physical link to another in the event of failure of one of the two links, however they do not know the complete topography of the network but only the part relating to the switching infrastructure, thereby ignoring devices connected to the switches, thus it is possible to have situations where data traffic is sent on a physical link which exceeds the maximum capacity of the link, with consequent data loss.

In a video surveillance system, such an eventuality should be avoided, because the loss of data may result in the loss of parts of the video or alarm signals.

The international patent application WO2015008282, filed by Cyberseal Ltd., discloses a security device for video surveillance systems, which can be a switch which is capable of implementing both the spanning tree protocols in case of failure of a link, and an incoming data traffic control to block possible cyber-attacks. Once installed, the safety device creates a network activity profile and detects possible cyber-attacks by verifying deviations of network traffic compared to the profile created. In the event of attacks, the safety device can disable a port, generate alert signals, or designate the recorded event as a possible cyber-attack.

Again, to improve the robustness of the video surveillance system, in some systems of this type the VMS knows the tasks performed by the different video cameras and, in the event that it cannot communicate with one of these, it can instruct another video camera to perform the task previously assigned to the first video camera. An example of these systems is described in WO2008142504.

Although it is connected to the network, even the VMS does not however know the network topology, therefore it is not able to avoid situations like the one mentioned above, in which, following the loss of a link, data traffic is routed over a link with lower capacity than required.

In the state of the art, video surveillance systems are also known in which the various sensors and video cameras coordinate between themselves to perform the tasks requested by the VMS in an optimal way. However, even in these systems, the various sensors and video cameras do not know the network topology and are not able to avoid special situations such as the one described above by managing the data traffic in an optimal way with respect to the capacity of the network links.

It is therefore necessary to have devices and methods which are able to manage the data traffic in a video surveillance system in an optimum manner, avoiding the loss of data packets, or at least reducing the risk in an acceptable manner, regardless of the manufacturer and model of the device.

PURPOSES AND SUMMARY OF THE INVENTION

A purpose of the present invention is to overcome the disadvantages of the prior art, and in particular to improve the robustness of known video surveillance systems.

A further purpose of the present invention is to provide a switch that allows network data traffic to be controlled, taking into account the topology of the network, the topology of devices, and the functions performed by the said devices.

It is also a purpose of the present invention to provide a network switch that, starting from information on the network topology, is able to automatically configure application parameters of the devices connected to it.

These and further purposes of the present invention are achieved by a method and a device incorporating the features of the annexed claims, which form an integral part of the present invention.

The basic idea of the present invention relates to a method for controlling the transfer of data packets in an IP network. A device transmits a plurality of data packets in the IP network that are received by a switch on an input port. The switch analyses the data packets received by the device and extracts information identifying the type of device connected, and on the basis of this information, identifies in an internal memory area the criteria for setting the operating parameters of an application software executed by the device. The switch provides the device with operating parameters that are calculated on the basis of the criteria contained in said memory area and the device executes said application software using the values provided by the switch.

This solution makes it possible both to rapidly configure the devices that are connected to the switch and to equally effectively reconfigure the devices in the event of loss of a link in the network to which the switch is connected.

In one embodiment, the switch receives from the device a first data packet, for example comprising an installation request according to the DHCP protocol that includes the MAC address of the device. Based on this MAC address, the switch finds, in the internal memory area, a specification of a communication protocol used to communicate with the device, and credentials to authenticate itself to the device. The switch thus authenticates itself to the device using the credentials and protocol identified in the internal memory area, and requests from the device information identifying the type of device connected. In response to the request from the switch, the device transmits to the switch a second data packet from which the switch extracts information identifying the type of device that is connected.

This embodiment thus allows multiple devices to be installed without requiring that the devices be configured to transmit special installation requests also comprising identifying information that would not be necessary in other operating environments.

In another embodiment, the device transmits a message containing the MAC address of the device and the information identifying the type of device connected, wherein the switch, on the basis of the MAC address, identifies further in the internal memory area a specification of a communication protocol to be used for communicating with said device, and wherein the switch composes a configuration message for the device according to the selected protocol, said configuration message comprising said operating parameters.

This solution makes possible a faster installation and a simpler communication protocol.

In one embodiment, when the switch is connected to a video recorder, the switch proceeds to its configuration, in particular, if the switch is also connected to a video camera, the switch transmits to the video recorder the URL of the video camera so that the video recorder can then retrieve a video stream to record from said URL.

The switch is therefore able to carry out not only intra-device configurations but also inter-device configurations, i.e. those that make it possible to manage communication between multiple devices.

Beneficially, in one embodiment the switch is configured to keep track of all the devices directly connected to it, and the bandwidth requirements of said devices. This solution enables the switch to coordinate with the other switches and have a knowledge of the network topology, and to manage critical events such as the loss of a link.

In one embodiment, the IP network comprises a plurality of switches that are configured to implement the same configuration functions for the devices linked to them as set out above. Each switch of said plurality of switches is configured to a) interact with other switches of said plurality of switches to receive information about the devices connected to said other switches, and b) store IP network topology information, said topology information comprising the following information:
   connection links between all the switches of said plurality of switches,
   a list of devices connected to each switch of said plurality of switches,
   the bandwidth requirements of each of said devices, c) calculate, for each link, the bandwidth necessary to satisfy data transfer requests for each device, d) coordinate with said other switches to identify the output port on which to transmit data packets received at the input port, in order to balance the overall network load between the network links;

the method providing further that, in the event of coordination with other switches, rules for data packet routing will be used such that a network link will be considered a critical link if it has a bandwidth less than that required by the IP network devices, each switch of said plurality of switches executing the same bit rate reduction algorithm, said bit rate reduction algorithm being suitable to:
   calculate a bit rate reduction factor for one or more of the devices whose data packets are being transported on said critical link, this bit rate reduction factor being such that by reducing the bit rate of said one or more devices by the bit rate reduction factor, the bandwidth capacity of the link is higher than the bandwidth requirements of all the devices whose data packets are being transported on said critical link,
   transmit to said one or more devices new operating parameters such that the bit rate of the data packets transmitted by said one or more devices is reduced by a factor at least equal to said reduction factor.

This solution allows efficient management of critical events such as the loss of a link, ensuring reliability and robustness of the network. This solution should therefore be useful in video surveillance systems.

It is also a purpose of the present invention to provide a switch configured to implement the methods described above, as better detailed in the description that follows.

Further characteristics and purposes of the present invention will become more apparent from the description that follows.

BRIEF DESCRIPTION OF THE DRAWINGS

The invention will be described below with reference to various examples, provided on an explanatory and non-limiting basis, and illustrated in the accompanying drawings. These drawings illustrate different aspects and embodiments of the present invention and, where appropriate, reference numbers showing structures, components, materials and/or similar elements in the various figures are denoted by similar reference numbers.

DETAILED DESCRIPTION OF THE INVENTION

While the invention is susceptible to various modifications and alternative constructions, various preferred embodiments are shown in the drawings and will be described hereinafter in detail. It should be understood, however, that there is no intention to limit the invention to the specific embodiment shown, but, on the contrary, the invention is intended to cover all modifications, alternative constructions, and equivalents which fall within the scope of the invention as defined in the claims.

The use of "for example", "e.g.", "etc.", or "or" indicate non-exclusive alternatives without limitation unless otherwise indicated. The use of "includes" means "includes but is not limited to" unless otherwise indicated.

The use of the term "application" indicates that the software runs on a surveillance device that interacts with the application layer of the OSI conceptual model.

Figure 1:
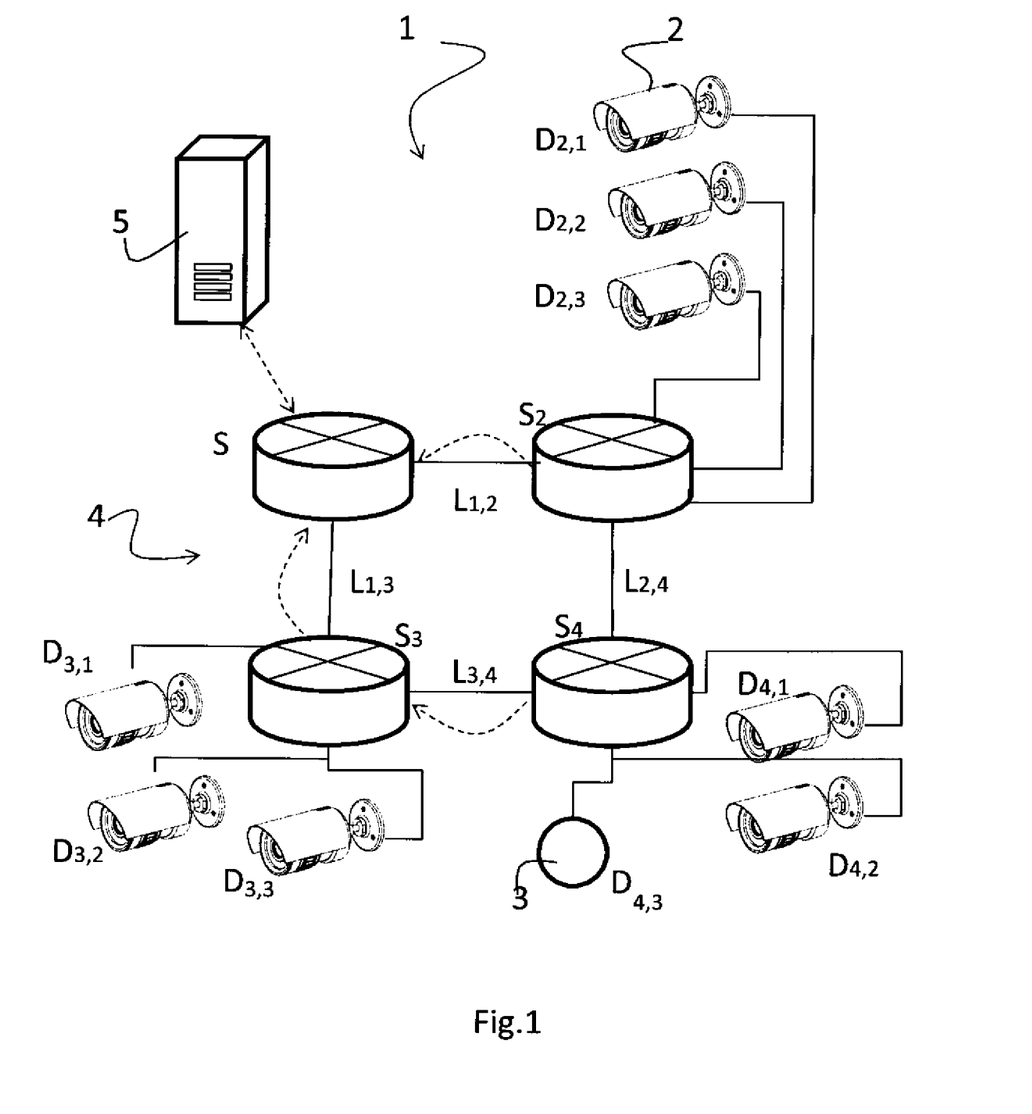
FIG. 1 shows a video surveillance system based on IP network according to the present invention.

With reference to FIG. 1, a CCTV system 1 is described comprising a plurality of video cameras 2 and detection sensors 3, connected to a video surveillance centre 5 (for example a computer on which VMS software is installed) via an IP network 4.

In the non-limiting example described hereinafter, the IP network 4 comprises four switches $S_1$, $S_2$, $S_3$, $S_4$ which are mutually connected by means of the bidirectional links $L_{1,2}$, $L_{1,4}$, $L_{2,3}$, $L_{3,4}$, that can, with no difference, be wired or wireless. The various devices, video cameras, sensors etc., are thus connected to the switches and in the following description will be generically identified by the symbol $D_{i,j}$, where the index i indicates the switch to which they are connected and the index j the switch port to which they are connected.

In a manner known per se, the switches $S_1$-$S_4$ exchange data packets with the various devices $D_{i,j}$ connected to the network 4, for example data packets containing the video recorded by one of the video cameras. To this end, the switches $S_1$-$S_4$ are provided with a plurality of ports 20 (shown in the diagram of FIG. 2 where a generic switch $S_i$ of the system is shown) for connection to the network 4, a control unit (in particular, a microprocessor) 21 and a memory area 22 in which the firmware that encompasses the various functions performable by the switch is stored. The control unit receives data packets from a device connected to one of the ports 20 (which in this situation thus functions as an input port) and determines an output port on which to transmit data packets received on the input port so that they reach the destination.

Figure 2:
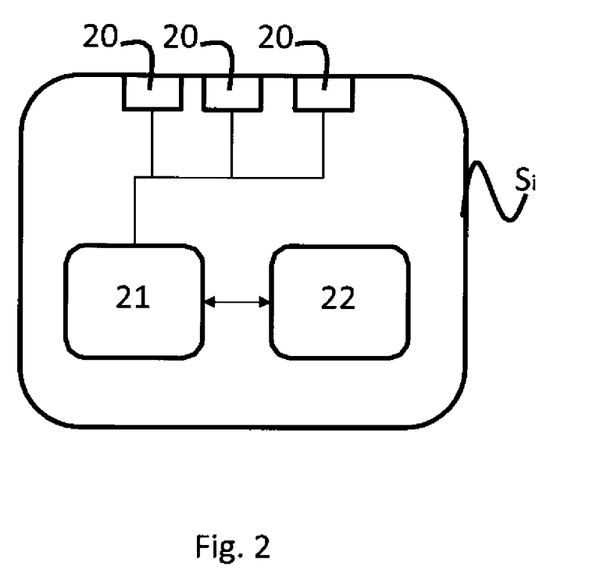
FIG. 2 shows a block diagram of a switch for use in the system of FIG. 1.

Among the various functions of the switch, a first function is that of automatic configuration of devices that are connected to its ports 20.

Operationally, the installation step of a device, for example a video camera or a sensor, in the surveillance system is carried out by following the steps described below and illustrated in FIG. 3.

Figure 3:
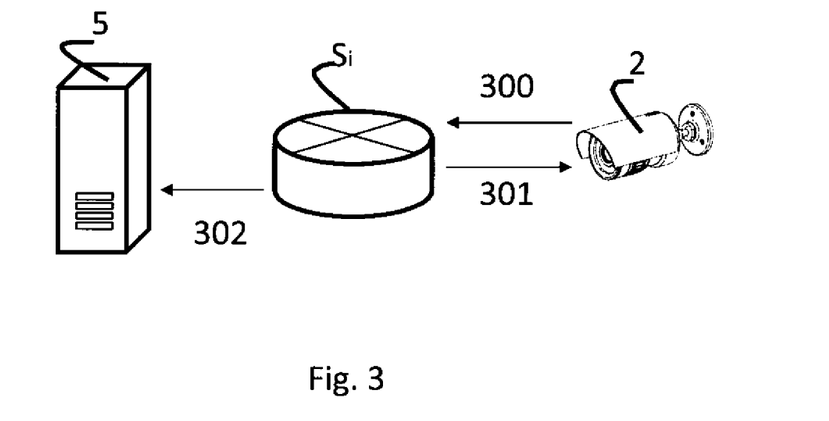
FIG. 3 illustrates the process of installing a video camera in the system of FIG. 1.

The intelligent switch $S_i$ recognises (step 300) that a device, in FIG. 3 a video camera 2, has been connected to one of its local ports 20 and identifies its type.

The identification of the type of device that is connected to the switch can occur in different ways.

In one embodiment, the device sends a DHCPDISCOVER broadcast message, with the source IP address conventionally set to 0.0.0.0, and the destination address set to 255.255.255.255 (broadcast address). This message, as known, contains the MAC address of the device that generates it.

The switch receives the DHCPDISCOVER message and extracts the OUI prefix from the MAC address. By using this prefix the switch identifies the manufacturer of the device and completes the procedure for assigning the IP address by exchanging with the device the DHCPOFFER, DHCPREQUEST, and DHCPACKNOWLEDGE packets, in accordance with the protocol.

The processor 21 of the switch interrogates the memory area 22 and obtains, based on the prefix OUI, the communication protocol (e.g. ONVIF or proprietary) and one or more sets of credentials (e.g. user name and password) to be used for authenticating itself with the device.

The processor 21 generates and transmits one or more messages that do/do not allow the switch to authenticate itself with the device according to the authentication protocol to be used with the latter.

In another embodiment, the device can send packets using the DHCPv6 protocol (Dynamic Host Configuration Protocol for IPv6, defined in RFC 3315, RFC 4361 and RFC 6221) and the assignment of addresses takes place by means of the SOLICIT, ADVERTISE, REQUEST, and REPLY packets.

In another embodiment, the device can send packets using the NDP protocol (Neighbor Discovery Protocol, defined in RFC4861) and assignment of addresses takes place by means of the ROUTER SOLICITATION, ROUTER ADVERTISEMENT, NEIGHBOR SOLICITATION, NEIGHBOR ADVERTISEMENT, and REDIRECT packets.

The authentication phase being complete, the processor 21 generates an interrogation message prompting the device to define its own device typology and/or functions supported, e.g. surveillance video camera, infrared sensor, etc.

In a different embodiment, it is the device that announces itself to the switch and provides the switch, via a configuration request or on request by the switch, the identification data of its manufacturer (identifiable by means of a text string or the OUI of its MAC address) and the device type, e.g. video camera.

In the event that a device $D_{i,j}$ connects to a switch $S_i$, the switch can wait a few seconds to check if the device announces itself, otherwise it can begin to query the device at the Data Link layer to identify it. In the particular case in which the connected device uses the ONIF protocol, recognition may take place by means of the WS-Discovery function provided by that protocol.

Once the type of the connected device has been identified, the processor 21 of the switch $S_i$ interrogates the memory area 22 and retrieves the rules necessary for the configuration of the device. The retrieval of these rules can be done based on the manufacturer (identified by the OUI prefix) and on the device type.

The switch then transmits (step 301) the configuration data to the device.

For example, based on rules stored in the memory 22, the processor 21 of the switch determines that for a video camera of a given manufacturer, e.g. identified by a given OUI prefix, it is necessary to transmit, according to a given format, the frame rate and the image size to be used; in this case the processor 21 generates and transmits, on the port to which the device is connected, one or more data packets packaged according to the selected communications protocol and containing information on the frame rate and image size (e.g. 768×1024 pixels) that can be chosen to maintain a default bit rate lower than a certain value.

If the switch identifies that the connected device is a video recorder and detects in the memory area 22 that for video recorders it is necessary to set up a URL with which to locate the video stream to be recorded, and the time for which the recording must be retained, then the switch provides one or more URLs of the video cameras connected to it and transmits to the connected video recorder a predefined value, e.g. 72 hours, for the retention time of the recordings.

In general, the switch $S_i$ performs a default configuration of the device which is connected to it and any other devices that need to communicate with the new device. The configuration includes two parts, not both of which may necessarily be performed:

intra-device configuration: the switch configures all the parameters, both at the network level and in the application executed by the device, which modify the behaviour of the device connected to the switch. The IP address, user credentials, and encryption settings are, for example, in this category.

inter-device configuration: the switch configures all the parameters that control the correct operation of functions involving two or more devices connected to the same switch. An example of these functions is the configuration of the network video recorders for the recording of the video cameras. In this case, the switch recognises that one or more video recorders and one or more video cameras are connected to its ports. In this case, the switch retrieves from the video cameras the URLs of the video streams and configures them in the video recorders, so that they know where to retrieve the video streams that must be saved. This configuration is useful because a video recorder is capable of recording the video cameras even if the connection to the central VMS is interrupted.

Preferably, each switch $S_i$ is also provided with a user interface through which the installer can change the default parameters or update the switch by uploading information for the installation of new devices connectable to the video surveillance system 1.

When the device configuration is complete, the switch adds (step 302) to the VMS 5 the device just recognised and configured. To do this, the VMS is configured in such a way as to accept requests from switches $S_1$-$S_4$ to add new devices to the system 1.

Beneficially, the new devices are registered by the switches with names characterised by a "sorting" prefix, which exploits the fact that the VMS in general tends to sort the devices in their interfaces in alphabetical order. Such a prefix thus comprises a first field that makes it possible to group the devices by switch, a second field that indicates to which switch port each device is connected, and a third field that indicates the device name, said third field can in turn be divided into sub-fields, for example to indicate the make and model of the device. An example of a device name registered with the VMS could be Switch #01-Port #01-Videotec-Ulisse Compact HD30x, where the prefix Switch #01-Port #01 indicates both the switch to which the device is connected and the port, to facilitate identification of the products if necessary and Videotec and CL Ulisse Compact HD30x are respectively the brand and model of the device.

Figure 4:
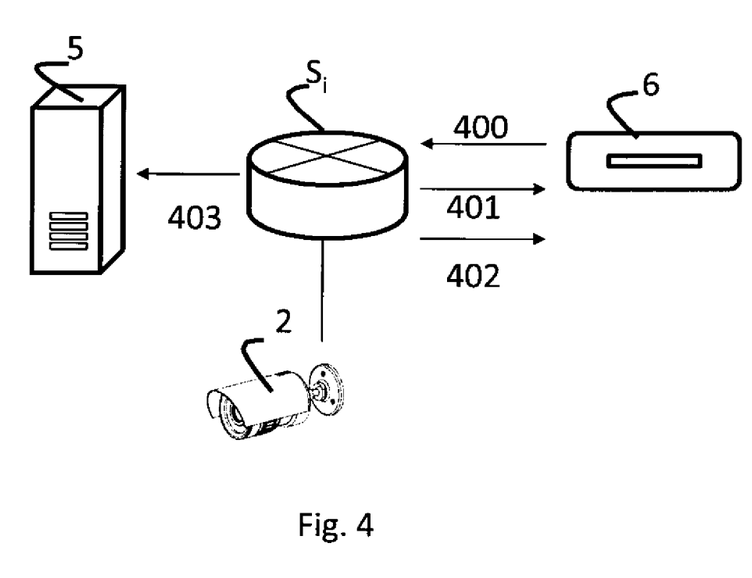
FIG. 4 illustrates the process of installing a video recorder in the system of FIG. 1.

By way of example, the assisted installation step for a video recorder 6 is illustrated in FIG. 4.

The switch $S_i$ recognises (step 400) that a video recorder 6 is connected to one of its local ports 20 and, after having identified the device type, proceeds (step 401) with the intra-device configuration by assigning an IP address to the video recorder (if the DHCP server function is implemented) and other parameters such as the retention time for the recordings.

The inter-device configuration is subsequently performed: the switch $S_i$ instructs the video recorder to create a recording task for a video stream that is located at a certain URL.

Figure 5:
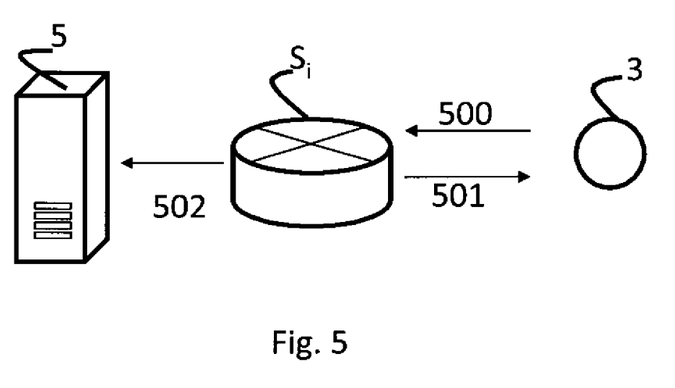
FIG. 5 illustrates the process of installing a detection sensor in the system of FIG. 1.

With reference to FIG. 5, the assisted installation of an access control system (e.g. a volumetric or infrared sensor) is now described. The installation is performed in a manner similar to that described above for the installation of a video camera, with the only difference being that instead of adding video streams, doors are added to the VMS. The switch $S_i$ detects (step 500) that an alarm detection system 3 has been connected to a port thereof, and after having identified the device type, configures (step 501) some of its specific parameters.

For example, if the switch $S_i$ identifies that the access control device connected is a device for controlling access to a door, it can configure the device so that it enables, for example, the free passage of people through the door at certain times and not at other times, or it can configure the device so that it allows the opening of the door only after checking a physical or electronic key, optionally with the emission of an alarm event when the door is opened. If the door access control device supports saving user credentials, the switch can upload a set of previously authorised access credentials, for example those for the system installers. When configuration of the alarm detection system 3 is complete, the switch adds (step 502) this device to the VMS.

The above examples thus illustrate how the switch is able to set up the parameters of the software applications that run on the devices.

The switches subsequently monitor the status of the links to detect any network congestion issues due either to a high number of installed devices or to network problems such as the loss of a link. In the event of problems, the switches provide, among the functions stored in the memory area 22, that of reconfiguration of the application parameters of the devices connected thereto in a manner dependent on the network topology.

The switches $S_i$ exchange information about devices linked to them and the bandwidth requirements thereof periodically or if an event, for example the installation or removal of a device from the system, materialises. Each switch is thus aware of the entire network topology (link, link capacity, and bandwidth requirements for each of the various devices connected to the network) and is able to coordinate with the others in order to transmit data from the devices $D_{i,j}$ to the VMS (and vice versa), according to a spanning tree protocol.

In the example of FIG. 1, assuming that the links $L_{1,2}$, $L_{1,3}$, $L_{2,4}$, $L_{3,4}$, have a capacity of 100 Mbit/s, that the video cameras generate data traffic of 15 Mbit/s, and that the access detection system generates data traffic of 0.1 Mbit/s, the switches coordinate with each other in such a way as to transmit data packets in the most balanced way possible. Assuming the result of the spanning tree, the data of the video cameras connected to the switch $S_2$ will thus be sent to the VMS via the link $L_{1,2}$, while the data of the other devices connected to the switches $S_3$ and $S_4$ will be sent to the VMS via the links $L_{3,4}$ and $L_{1,3}$ according to the spanning tree path identified by the dashed arrows shown in FIG. 1.

In addition to executing a spanning tree protocol, the switches are configured to set the bit rate of the various devices as a function of the network topology so as to ensure that the VMS correctly receives the video streams.

Beneficially, the switches $S_i$ are each equipped with a user interface, which can be accessed from a PC via the network, which allows the user to set a number of parameters, such as the priority level for the installed devices.

In the event of deterioration of network connectivity and congestion of reception of video streams by the VMS, switches $S_1$-$S_4$ react by reconfiguring the devices connected thereto based on both the network topology and the priority levels of the various devices. Video cameras intended to record shots that are more important than others (e.g. an entrance rather than a corridor) will thus be set to a higher priority level and in the event of network degradation, are assured a bit rate greater than that granted to video cameras with lower priorities.

Figure 6:
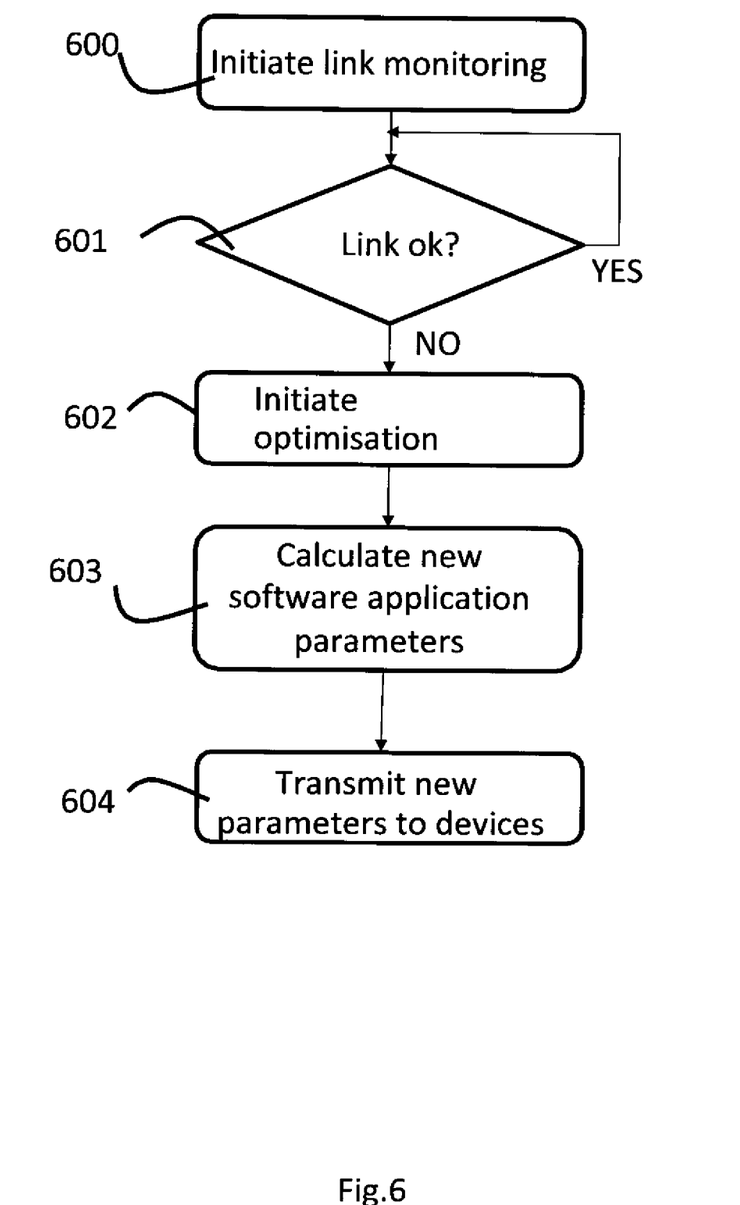
FIG. 6 is a flow diagram relating to the process of adjusting the bit rate of the devices of the surveillance system.

The adjustment of the bit rate is made by switches according to the method described below with reference to FIGS. 6 and 7.

Each switch $S_i$ initiates a link status monitoring process, step 600, and checks (step 601) if all links satisfy the bandwidth capacity required by the devices $D_{i,j}$ connected to the network.

Figure 7:
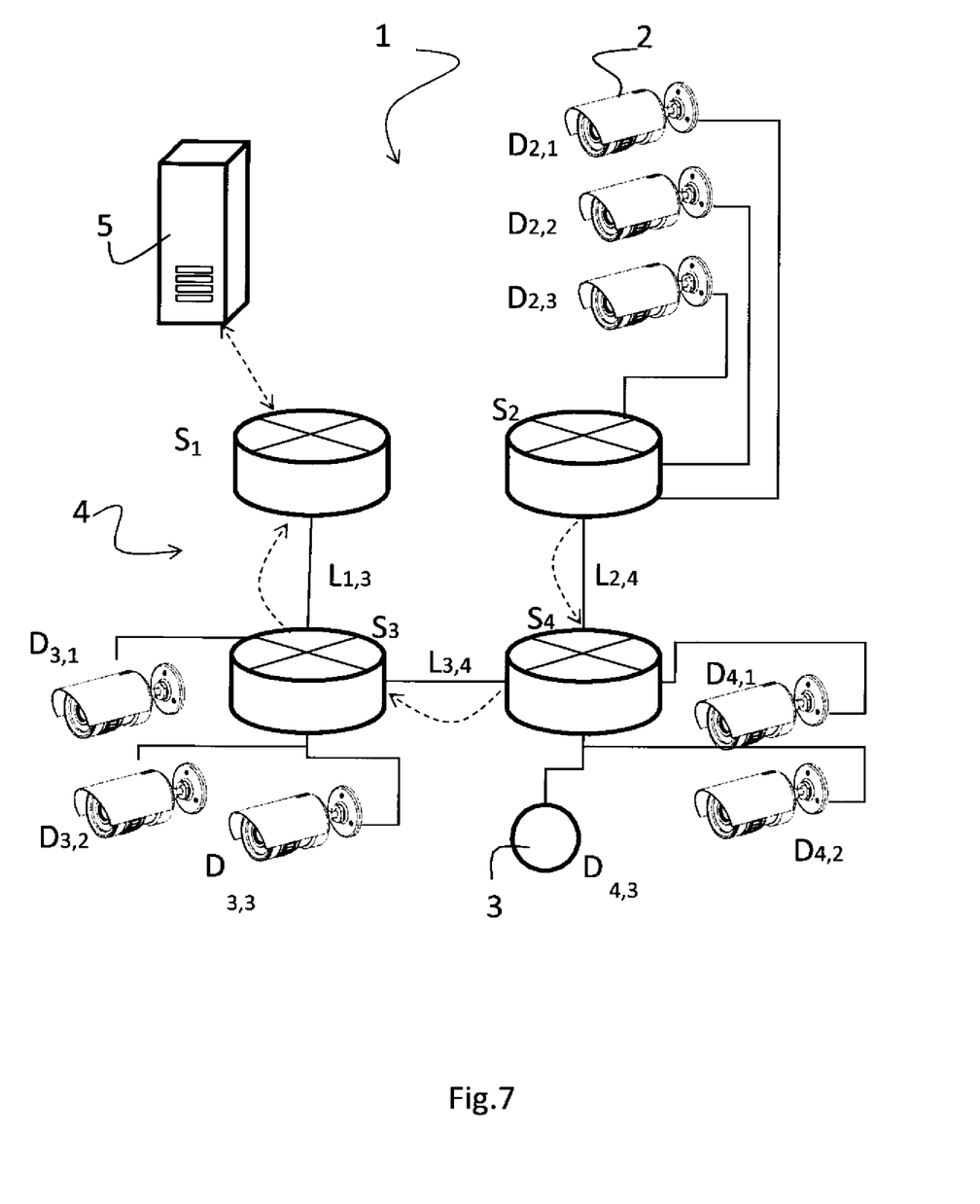
FIG. 7 shows the system of FIG. 1 in the event of an IP network link failure.

Take for example a situation in which a link is interrupted, as shown in FIG. 7, where the link $L_{1,2}$ is no longer present. The switches $S_1$ and $S_2$ detect the interruption of the link and communicate this to the other two switches $S_3$ and $S_4$, thus all the switches are made aware of the interruption of the link $L_{1,2}$.

When the switches detect the interruption of the link $L_{1,2}$, they reconfigure themselves to transmit data packets according to the new spanning tree indicated by the dashed arrows in FIG. 7.

In this configuration, the switches $S_1$-$S_4$ verify that 8×15 Mbit/s+0.1 Mbit/s=120.1 Mbit/s would be transported on the link $L_{1,3}$, which is greater than the maximum capacity of the link $L_{1,3}$; this means that data packets will be lost.

When the switches identify a critical issue such as this, they perform a bit rate optimisation algorithm (step 602) that, taking into account the network topology, solves the problem of determining the maximum quality for each device present in the CCTV network subject to the constraint that the sum of all the data flow bit rates that are transported on each connection between the switches does not exceed the capacity of each link.

In mathematical terms, the algorithm solves the following system of equations:

$$\begin{cases} \max Q_{i,j} & \forall\, i \in [1, |S|], \forall\, j \in [1, M_i] \\ \sum_{\substack{a \in [1,|S|] \\ b \in [1,M_a]}} b_{i,j}(a, b, Q_{a,b}, P_{a,b}) < C_{i,j} & \forall\, i \in [1, |S|], \forall\, j \in [1, |S|] \end{cases}$$

Where:

$S_i$ is the i-th switch that constitutes the network of the system 1.

S is the set of all the switches which make up the network. |S| is the cardinality of this set.

$L_{i,j}$ is the link that connects the i-th switch to the j-th switch. In this case, $L_{i,j}=L_{j,i}$, because in CCTV applications there are no unidirectional connections.

$C_{i,j}$ is the maximum transmission capacity of the link $L_{i,j}$ from the i-th switch to the j-th switch. In general, $C_{i,j}$ differs from $C_{j,i}$, because some links may be made with asymmetric connections, such as for example UMTS/HSPA+, in which the uplink and downlink have different bandwidths. Given a particular i and j, $C_{i,j}=0$ implies that there is no transmission from i to j. $C_{i,j}=0$ and $C_{j,i}=0$ simultaneously means that the switches i and j are not connected.

$D_{i,j}$ is the device connected to the j-th port of the i-th switch.

$Q_{i,j}$ is the quality of the signal to be transmitted on the device $D_{i,j}$. For devices such as access control devices, this will be a constant rather than a variable value. $Q_{i,j}=0$ if the j-th port of the i-th switch is not connected to anything. Since, in general, the number of switch ports is not constant, we consider that j takes values in the interval [1, $M_i$], where $M_i$ is the number of ports of the i-th switch.

$P_{a,b}$ specifies which type of device is connected to the b-th port of the a-th switch. This indicates if the device is a video camera, a video recorder, an access control device, or a device of other type or null type.

The function $b_{i,j}$ (a, b, $Q_{a,b}$, $P_{a,b}$) is the function which maps the bit rate capacity generated by the device connected to the b-th port of the a-th switch on the connection that goes from the i-th switch to the j-th switch. This function takes as input not only the device quality but also the specification of where the device is connected, namely the parameters a and b, to apply a different modulation of the bit rate based on the shot to be recorded. It also takes into account the device type, $P_{a,b}$, to understand if and how it is possible to modulate the bit rate depending on the device type.

To better illustrate the algorithm, an example relevant to the situation of FIG. 7 is taken. Being:

$C_{1,2}=C_{2,1}=0$ Mbit/s because it is interrupted
$C_{1,3}=C_{3,1}=100$ Mbit/s
$C_{3,4}=C_{4,3}=100$ Mbit/s
$C_{2,4}=C_{4,2}=100$ Mbit/s
$P_{2,1}$=video camera
$P_{2,2}$=video camera
$P_{2,3}$=video camera
$P_{3,1}$=video camera
$P_{3,2}$=video camera
$P_{3,3}$=video camera
$P_{4,1}$=video camera
$P_{4,2}$=video camera
$P_{4,3}$=access control
$Q_{2,1}$=(width 1920, height 1080p, frame rate 60 fps)
$Q_{2,2}$=(width 1920, height 1080p, frame rate 60 fps)
$Q_{2,3}$=(width 1920, height 1080p, frame rate 60 fps)
$Q_{3,1}$=(width 1920, height 1080p, frame rate 60 fps)
$Q_{3,2}$=(width 1920, height 1080p, frame rate 60 fps)
$Q_{3,3}$=(width 1920, height 1080p, frame rate 60 fps)
$Q_{4,1}$=(width 1920, height 1080p, frame rate 60 fps)
$Q_{4,2}$=(width 1920, height 1080p, frame rate 60 fps)
$Q_{4,3}$=dummy value, constant 1.

It is known that the quality of video streams for very small quantisation steps, i.e. for compression ratios that are not too high, followed by entropic coding, as for example in the case of H.264/AVC, can be linked to the bit rate by using a coefficient of 0.1 bits per pixel. In this case, whereas real-time video compressors achieve sub-optimal performance, we use a quality specification of 0.12 bits per pixel, which results in a bit rate for the video cameras equal to 1920*1080*60*0.12=(approximately) 15 Mbit/s. As a result:

$b_{2,1}$ (2,1, (width 1920, height 1080p, frame rate 60 fps), video camera)=15 Mbit/s $b_{2,1}$ (2,2, (width 1920, height 1080p, frame rate 60 fps), video camera)=15 Mbit/s $b_{2,1}$ (2,3, (width 1920, height 1080p, frame rate 60 fps), video camera)=15 Mbit/s $b_{3,1}$ (3,1, (width 1920, height 1080p, frame rate 60 fps), video camera)=15 Mbit/s $b_{3,1}$ (3,2, (width 1920, height 1080p, frame rate 60 fps), video camera)=15 Mbit/s $b_{3,1}$ (3,3, (width 1920, height 1080p, frame rate 60 fps), video camera)=15 Mbit/s $b_{4,3}$ (4,1, (width 1920, height 1080p, frame rate 60 fps), video camera)=15 Mbit/s $b_{4,3}$ (4,2, (width 1920, height 1080p, frame rate 60 fps), video camera)=15 Mbit/s $b_{4,3}$ (3,3, 1, access control device)=0.1 Mbit/s $b_{3,2}$ (4,1, (width 1920, height 1080p, frame rate 60 fps), video camera)=15 Mbit/s $b_{3,2}$ (4,2, (width 1920, height 1080p, frame rate 60 fps), video camera)=15 Mbit/s $b_{3,2}$ (3,3, 1, access control device)=0.1 Mbit/s In this example, as a result of the inputs provided by the installer (such as, for example, a lower priority for the cameras of $S_4$), the function $b_{i,j}$ (a, b, $Q_{a,b}$, $P_{a,b}$) for this system is defined to modulate the bit rate of the two video cameras connected to the switch $S_4$ using a factor of 2 with respect to the video cameras connected to $S_2$ and $S_3$. The function $b_{i,j}$ (a, b, $Q_{a,b}$, $P_{a,b}$) is also defined not to modulate the bit rate for the access control device.

The function $Q_{a,b}$ for the video camera is defined as $Q_{a,b}$=frames per second of the video camera $D_{a,b}$ That is to say, the image size is left unaltered and the video quality is reduced by reducing the frame rate.

Given these assumptions, the factor x with which to modulate the bit rate can be calculated as follows:

$$6 \cdot 15(1-x) + 2 \cdot 15(1-2x) + 0.1 < 100$$
$$90 - 90x + 30 - 60x + 0.1 < 100$$
$$-150x < -20.1$$
$$x > \frac{20.1}{150} = 0.134$$

From this value of x the switches deduce the target maximum bit rate, that for $D_{4,1}$ and $D_{4,2}$ is 15 Mbit/s*(1−2x)=10.98 Mbit/s, while for the other video cameras it is 15 Mbit/s*(1−x)=12.99 Mbit/s, and the bit rate of the access control device is left unaltered. It is thus possible to determine the maximum video camera quality that proves to be $$Q_{4,1} = Q_{4,2} = \left\lfloor \frac{10.98}{15} 60 \right\rfloor = 43 \text{ fps}$$

$$Q_{2,*} = Q_{3,*} = \left\lfloor \frac{12.99}{15} 60 \right\rfloor = 50 \text{ fps}$$

maintaining unchanged the video encoder quantisation step, and modulating only the frame rate.

Once the optimisation algorithm has completed, each switch accordingly determines (step 603), the parameters for the software applications that run on the devices connected thereto, determining the transmission bit rates of the latter. Each switch $S_1$-$S_4$ transmits (step 604) to the devices connected thereto the new parameters for the software applications, which will thus reduce the bit rate, leading to an overall network traffic that is compatible with the network bandwidth capacity.

The abovementioned description makes it possible to understand how the video surveillance system and the switches included therein make it possible to achieve the abovementioned objectives.

In particular, the ability of the switches to set the parameters of devices connected thereto based on the device type connected makes possible a quick but thorough configuration and/or reconfiguration (in case of link failure) of the video surveillance system.

The field technician can then make many variations to the video surveillance system, for example by installing not only surveillance devices such as video cameras and alarm detection systems, but also other devices such as I/O devices, evacuation alarm devices (such as sirens or digital speakers), and more generally IP devices equipped with sensors and/or actuators.

The device in question can still use different modulation strategies for the video camera bit rates, for example:
- reducing the frame rate while keeping the image size and video quality constant
- reducing the video quality while keeping the image size and frame rate constant
- reducing the image size while keeping the frame rate and video quality constant
- a combination of the three previous strategies with very precise intervals. The frame rate can thus, for example, be modulated, reducing the initial bit rate by as much as 30%, and then the bit rate can continue to be reduced by reducing the video quality.

The invention claimed is:

1. A method for controlling the transfer of data packets in an IP network, wherein the IP network includes a plurality of switches and a plurality of devices connected to the plurality of switches, wherein each switch of the plurality of switches is configured to receive on an input port data packets transmitted from a device of the plurality of devices, the method comprising the following steps performed by the switch:

a) analysing the data packets received from said device and extracting information identifying the type of device connected, b) based on said identifying information, identifying in an internal memory area, criteria to set operating parameters of a software application executed by said device, c) providing to the device said operating parameters calculated on the basis of the criteria contained in said internal memory area, d) communicating with other switches of said plurality of switches to receive information about devices connected to said other switches, e) storing in a memory, topology information relating to the IP network, said topology information comprising:
connection links between all the switches of said plurality of switches,
a list of devices of said plurality of devices connected to each switch of said plurality of switches, and
bandwidth requirements for each of the plurality of devices, f) calculating, for each of the connection links, a bandwidth request necessary to satisfy data transfer requests for each device, and g) coordinating with said other switches of said plurality of switches to identify an output port on which to transmit the data packets received at the input port, thereby balancing the total network load between each of the connection links of the IP network;

wherein when the coordination with the other switches of said plurality of switches results in routing rules of the data packets such that a link of the IP network is a critical link with a bandwidth capacity less than that required by the devices of said plurality of devices of said IP network, each switch of said plurality of switches performs a same bitrate reduction algorithm, the bitrate reduction algorithm comprising the steps of:
calculating a reduction factor of the bitrate of one or more devices of said plurality of devices whose data packets transport said critical link, said reduction factor of the bitrate being such that by reducing the bitrate of said one or more devices by the bitrate reduction factor, the bandwidth capacity of the link is greater than the bandwidth request of all the devices whose data packets pass on said critical link,
transmitting to said one or more devices new operating parameters such that the bitrate of the data packets transmitted by said one or more devices is reduced by a factor greater than or equal to said reduction factor, and
performing, on said one or more devices, said software application using the new operating parameters provided by the switch.

2. The method according to claim 1, wherein at least one switch of said plurality of switches performs the steps of:
receiving a first data packet from at least one device of said plurality of devices, said first data packet including a MAC address of the at least one device,
identifying in the internal memory area based on the MAC address an indication of a communication protocol to be used to communicate with the at least one device and credentials to authenticate to the at least one device,
authenticating to the at least one device using the credentials and protocol identified in the internal memory area,
requesting to said at least one device said information identifying the type of the connected device,
wherein said at least one device transmits to the at least one switch a second data packet in response to the request from the at least one switch,
and wherein the at least one switch extracts said information identifying the type of device connected from said second data packet.

3. The method according to claim 2, wherein the first data packet includes a request for installation according to a protocol comprising one or more of DHCP, DHCPv6 and NDP.

4. The method according to claim 1, wherein the device transmits a message comprising a MAC address of the device and the information identifying the type of device connected, wherein the switch, on the basis of the MAC address, further identifies in the internal memory area, an indication of a communication protocol to be used to communicate with the device, and wherein the switch prepares a configuration message for the device according to a selected communication protocol, said configuration message including said operating parameters.

5. The method according to claim 1, wherein the device is a video recorder and wherein a video camera is also connected to at least one switch, wherein the switch transmits to the video recorder a URL of the video camera, and wherein the video recorder retrieves a video stream to be recorded by that URL.

6. The method according to claim 1, wherein the switch is configured to keep track of all the devices directly connected to it and of the bandwidth requirements of said devices connected to it.

7. A network switch comprising:
an input port for receiving data packets transmitted by an external device,
a plurality of output ports,
a control unit for determining an output port of said plurality on which to transmit the data packets received in the input port,
the network switch further comprising a memory area containing criteria for setting operating parameters of a software application executable by the external device,
wherein the control unit is configured to analyse the data packets received on the input port by the external device and to extract, if present, an information identifying the type of device being connected, and
on the basis of said identifying information, identifying in an internal memory area, the criteria to set operating parameters of said software application executed by said external device, to provide to the external device new operating parameters calculated based on the criteria contained in said memory area, the network switch further configured to:
keep memory of devices directly connected to the network switch and of bandwidth requests of devices connected to the network switch,
communicate with other switches of a plurality of switches connected in an IP network for receiving information on the devices connected to said other switches,
store in a memory a topology information for the IP network, said topology information comprising:
connection links between all of the switches of said plurality of switches,
a list of the devices connected to each of said plurality of switches,
bandwidth requests of each of said devices,
calculate, for each link, the bandwidth request necessary to satisfy the requests of data transfer of each device;
coordinate with said other switches of said plurality of switches to identify the output port on which to transmit the data packets received at the input port, so as to balance the total network load between the links of the IP network;
execute a bitrate reduction algorithm, in case coordination with the other switch of said plurality of switches results in routing rules of the data packets such that a link of the network is a critical link that has a bandwidth capacity less than that required by the IP network devices, said bitrate reduction algorithm configured to:
calculate a reduction factor of the bitrate of one or more of the devices whose data packets pass on said critical link, said reduction factor of the bitrate being such that by reducing the bitrate of said one or more devices by the bitrate reduction factor, the bandwidth capacity of the link is greater than the bandwidth request of all the devices whose data packets pass on said critical link, and
transmit to said one or more devices connected to the network switch new operating parameters such that the bit rate of the data packets transmitted by said one or more devices is reduced by a factor at least equal to said reduction factor, whereby said one or more devices performs said software application using the new operating parameters provided by the switch.

8. The network switch according to claim 7, wherein the control unit is configured to:
receive a first data packet from the external device, said first data packet including a MAC address of the external device, based on the MAC address, identify in the internal memory an indication of a communication protocol to be used to communicate with the external device and credentials to log into the external device,
authenticate to the external device using the credentials and protocol identified in the internal memory area,
request from said external device said information identifying the type of device being connected.

* * * * *